United States Patent Office 2,868,620
Patented Jan. 13, 1959

2,868,620

METHOD OF MAKING PLUTONIUM DIOXIDE

Clifford S. Garner, Redondo Beach, Calif., assignor to the United States of America as represented by the United States Atomic Energy Commission No Drawing. Application June 9, 1947
Serial No. 753,569

5 Claims. (Cl. 23—14.5)

This invention relates to a process of converting plutonium oxalates to plutonium oxides by dry conversion methods.

One of the most readily available pure plutonium compounds is plutonium oxalate. This oxalate is available because it is an end product in a wet chemistry decontamination of plutonium made by neutron irradiation of uranium. On the other hand, plutonium dioxide ($PuO_2$) may be readily converted to plutonium salts or be used for direct conversion to, or as intermediates in the production of, pure plutonium metal. Therefore, it is necessary that it be obtained in a very pure state unmixed with any other compound, such as plutonium carbonates or other plutonium oxides, for example, plutonium sesquioxide, which would decrease the efficiency of the production of, and possibly the purity of, the final plutonium metal. Thus, methods for converting the plutonium oxalates to plutonium dioxide are especially desirable.

The primary object of this invention is, therefore, to provide methods for converting plutonium oxalates to the oxides under controlled conditions that minimize all danger of injury to personnel.

Another object of this invention is to provide methods for converting the plutonium oxalate to plutonium dioxide which is free of all impurities, such as other oxides or carbonates of plutonium.

A further object of this invention is to provide methods for quickly and efficiently converting the plutonium oxalates to pure plutonium dioxide by the methods of dry chemistry with high yields and minimizing of decrepitation.

Still further objects and advantages of this invention will appear in the following description.

The objects of this invention are achieved by carefully drying the lower valence plutonium oxalate and then heating to a temperature at which the plutonium oxalate decomposes to green plutonium dioxide ($PuO_2$) at a substantial rate.

In the drying operation it is desirable to increase the temperature gradually in order to prevent splattering due to the evolution of the carbon monoxide and dioxide, and the decrepitation of the plutonium compound, which occurs if the plutonium compound is heated too rapidly. Both splattering and decrepitation must be avoided because they introduce a health hazard, require additional time for cleaning and decontaminating the equipment, and increase the time necessary to process a batch of the oxalate. It is feasible to dry with a controlled gas flow in order to sweep away the decomposition gases without causing entrainment of the radioactive material and/or toxic fumes which may be produced.

After drying, the plutonium compound is heated to a decomposition temperature for a period of time sufficiently long to completely and efficiently convert the plutonium oxalate to plutonium dioxide. In order to obtain plutonium dioxide of the desired purity and in the desired state, the rate of heating and the final reaction temperature should be controlled rather carefully. The decomposition of the plutonium oxalate begins at about 250° C. and can be rapidly completed at 400° C. However, plutonium oxide which is formed by the rapid heating of plutonium oxalate at a temperature of about 300° C. in either vacuo, in air, or in an atmosphere of a gas such as carbon dioxide, gives a black oxide. This black oxide tends to adhere to the vessel in which it is ignited and is very difficult to process further. For example, it is difficult to hydrofluorinate the black plutonium oxide to plutonium tetrafluoride. This latter material is very desirable as an intermediate product in the production of pure plutonium. Consequently, if the black oxide is not desired then it is advisable to raise the temperature sharply when the material reaches 300° C.

It is particularly desirable to prepare the plutonium dioxide by heating at a final temperature greater than 400° C. because complete conversion is more rapidly effected at high temperatures up to the order of 800° C.

The extent to which the final reaction temperature can be increased is limited, however, by the fact that when the oxalate is heated substantially above a temperature of 600° C., the resultant oxide is difficult to process further. For example, such an oxide prepared by the heating of the oxalate substantially above 600° C., is also difficult to hydrofluorinate requiring about twice as long for such conversion as plutonium dioxide prepared by heating the oxalate to about 400° C. to 600° C. Moreover, as the temperature is increased, the vapor pressure of the plutonium compounds naturally rise and the danger of the radioactive material and/or toxic fumes to personnel consequently increases tremendously. For these reasons a final reaction temperature of from 400° C. to 600° C. is desirable and a temperature of about 600° C. is preferable.

As an example of the method of this invention, an embodiment is presented in the following examples for the purpose of illustrating the invention, but not for the purpose of limiting its spirit or scope.

*Example 1*

About 150 grams of partially dried plutonium oxalate are placed in a relatively thin layer in a platinum-rhodium boat which is in a sub-atmospheric pressure hood or dry box. The boat is then placed in a quartz tube and exposed to the flow of pure dry air at 50° C. for about three hours. When air or any gas is passed over a plutonium compound, a trap is placed in the exhaust line to filter out any radioactive material and/or toxic fumes which may be picked up. The pre-drying of the plutonium oxalate with a stream of warm gas prevents the splattering which occurs if the partially dry plutonium oxalate is later heated too rapidly. Even at the rather low temperature used, the drying proceeds rather rapidly because of the low solubility of plutonium oxalate in water with the resultant essentially normal vapor pressure of water in slurry. The platinum-rhodium boat is then carefully loaded into the reaction unit and pure dry air is passed over the compound while it is subjected to a dry ignition program using a time-temperature cycle as follows:

0.2 hour to 130° C.
3.0 hours at 130° C.
0.5 hour to 250° C.
1.8 hours to 300° C.
0.3 hour to 600° C.
0.4 hour at 600° C.
0.3 hour to 25° C.
6.5 hours total The conversion of plutonium oxalate, treated in accordance with this example, is substantially complete. The plutonium dioxide (PuO$_2$) formed contains no detectable amount of impurities such as plutonium peroxide or plutonium sesquioxide. The equation is throught to be:

$$Pu_2(C_2O_4)_3 = 2PuO_2 + 4CO + 2CO_2$$

This plutonium dioxide is olive green in color, as distinguished from the black plutonium oxide prepared by the heating of the oxalate at 300° C. as stated hereinbefore. Both the black plutonium oxide and olive-green plutonium dioxide appear to have the same crystalline structure being face-centered cubic in form. The true density of the olive-green plutonium dioxide produced by the method of this invention is of the order of 11.4 grams per milliliter; the bulk density of this same kind of oxide is much lower.

It is sometimes convenient to dehydrate the plutonium oxalate by heating overnight to 200° C. If such dehydration or complete removal of water is carried out, the time for the reaction heating, described hereinbefore, is of course decreased.

Although the example has been applied to plutonium trioxalate, the plutonium tetraoxalate can be similarly treated to form the same product. In like manner it may be readily seen that there are many other possible embodiments of the method of this invention, such as, modifying the time-temperature cycle or performing the heating in vacuo or in the presence of a gas such as air, oxygen or even carbon dioxide. For this reason it is not intended to limit the spirit or scope of this invention except as indicated in the appended claims.

What is claimed is:

1. The process of converting plus three plutonium oxalate to substantially pure, green plutonium dioxide which comprises drying the plutonium oxalate with a stream of warm air, and heating to an advanced temperature of about 600° C., passing through the range from 300° C. to 600° C. in about 0.3 of an hour.

2. The process of converting plus three plutonium oxalate to substantially pure, green plutonium dioxide which comprises drying the plutonium oxalate with a stream of warm air, and forming the dioxide by heating the dried oxalate, according to the following temperature cycle:

0.2 hour to 130° C.
3.0 hours at 130° C.
0.5 hour to 250° C.
1.8 hours to 300° C.
0.3 hour to 600° C.
0.4 hour at 600° C.

3. The process of converting plus four plutonium oxalate to substantially pure plutonium dioxide which comprises drying the plutonium oxalate with a stream of warm air, and heating to a temperature of about 600° C., passing through the range from 300° C. to 600° C. in about 0.3 hour.

4. The process of converting plus four plutonium oxalate to substantially pure plutonium dioxide which comprises drying the plutonium oxalate with a stream of warm air, and forming the dioxide by heating the dried oxalate according to the following temperature cycle:

0.2 hour to 130° C.
3.0 hours at 130° C.
0.5 hour to 250° C.
1.8 hours to 300° C.
0.3 hour to 600° C.
0.4 hour at 600° C.

5. The process of converting a plutonium compound selected from the group consisting of plus three plutonium oxalate and plus four plutonium oxalate to substantially pure plutonium dioxide which comprises drying the plutonium oxalate with a stream of warm air, and heating to a temperature within the range from 400° C. to 600° C., passing through the range from 300° C. to the final temperature in about 0.3 hour.

References Cited in the file of this patent

UNITED STATES PATENTS 2,099,325    Zellmann et al. _____ Nov. 16, 1937

OTHER REFERENCES

Accum: A Practical Essay on Chemical Reagents or Tests, page 68 (1817), publ. by M. Carey & Sons, Philadelphia.

Kohlschutter: Berichte der deutsche chemische Gesellschaft, vol. 34, pp. 3625, 3626 (1901).

Boltwood: American Journal of Science, Series 4, vol. 25, p. 277 (1908).

Westrum, Jr.: Paper 6.57 in "The Transuranium Elements" by Seaborg et al., vol. IV–14B, pp. 936, 938 (1949). The latest date (December 15, 1944) reported at the bottom of p. 936 upon which Westrum's contribution is based is relied on to show prior knowledge of the claimed invention.

Cunningham: Chapter 10 in "The Actinide Elements" by Seaborg et al., vol. IV–14A, pp. 371, 394, 395, 431 (1954), which reports on page 394 as bibliographic reference 64 an AEC Document LA–172 to Moulton (November 14, 1944) and this date relied on to show prior knowledge of the claimed invention.